United States Patent
Chevrier et al.

(10) Patent No.: US 9,267,829 B2
(45) Date of Patent: Feb. 23, 2016

(54) SINGLE TRANSCEIVER ULTRASONIC FLOW METER HAVING AN ARRAY OF TRANSDUCER ELEMENTS

(71) Applicant: TEXAS INSTRUMENTS DEUTSCHLAND GMBH, Freising (DE)

(72) Inventors: Matthieu Chevrier, Freising (DE); Michael Weitz, Wangen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 146 days.

(21) Appl. No.: 14/072,605

(22) Filed: Nov. 5, 2013

(65) Prior Publication Data

US 2015/0020608 A1  Jan. 22, 2015

Related U.S. Application Data (60) Provisional application No. 61/856,387, filed on Jul. 19, 2013, provisional application No. 61/866,467, filed on Aug. 15, 2013.

(51) Int. Cl.
G01F 1/66 (2006.01)
H02H 9/00 (2006.01)
H02H 9/02 (2006.01)

(52) U.S. Cl.
CPC ............... *G01F 1/667* (2013.01); *G01F 1/662* (2013.01); *H02H 9/005* (2013.01); *H02H 9/025* (2013.01)

(58) Field of Classification Search
None
See application file for complete search history.

(56) References Cited

U.S. PATENT DOCUMENTS

| | | | | |
|---|---|---|---|---|
| 4,385,255 A * | 5/1983 | Yamaguchi et al. | ........... | 310/335 |
| 4,387,720 A * | 6/1983 | Miller | ............. | 600/472 |
| 6,554,826 B1 * | 4/2003 | Deardorff | ......... | 606/27 |
| 6,789,427 B2 * | 9/2004 | Batzinger et al. | .............. | 73/614 |
| 7,624,651 B2 * | 12/2009 | Fernald et al. | ............. | 73/861.27 |
| 2009/0025487 A1 * | 1/2009 | Gysling et al. | ............. | 73/861.25 |
| 2011/0094309 A1 * | 4/2011 | Berger et al. | ............. | 73/861.28 |
| 2014/0305215 A1 * | 10/2014 | Dabak et al. | .................... | 73/592 |

FOREIGN PATENT DOCUMENTS

WO   WO 9724585 A1 *   7/1997   ................ G01F 1/66

\* cited by examiner

*Primary Examiner* — Harshad R Patel
(74) *Attorney, Agent, or Firm* — Gregory J. Albin; Frank D. Cimino (57) ABSTRACT

Elements of a single beam-forming array of ultrasonic transducer elements are selectively activated to direct two or more ultrasonic beams to a series of acoustic mirrors mounted to or fabricated at known locations at an inside surface of the pipe. The ultrasonic beams traverse measurement path segments at known angles through a fluid flowing through the pipe before being received back at the single transducer array. Fluid flow velocity along the fluid flow path is calculated as a function of a difference in time-of-flight (TOF) along first and second ultrasonic beam paths after subtracting TOF components contributed by known-length non-measurement path segments. The difference in TOF results from an additive downstream fluid flow velocity vector component along a first measurement path segment and a subtractive upstream fluid flow velocity vector component along a second measurement path segment.

20 Claims, 7 Drawing Sheets

SINGLE TRANSCEIVER ULTRASONIC FLOW METER HAVING AN ARRAY OF TRANSDUCER ELEMENTS

PRIORITY CLAIM

This application claims the benefit of priority under 35 U.S.C. §119(e) to U.S. Provisional Patent Application Ser. No. 61/856,387 titled "SINGLE XCVR" filed on Jul. 19, 2013 and U.S. Provisional Patent Application Ser. No. 61/866,467 titled "SINGLE XCVR" filed on Aug. 15, 2013, both incorporated herein by reference in their entirety.

TECHNICAL FIELD

Structures and methods described herein relate to the measurement of fluid flow rates in pipes and tubing, including comparing the time-of-flight (TOF) of ultrasonic pulses sent through the fluid to detect downstream and upstream fluid velocity contributions to the TOF.

BACKGROUND INFORMATION

Figure 1:
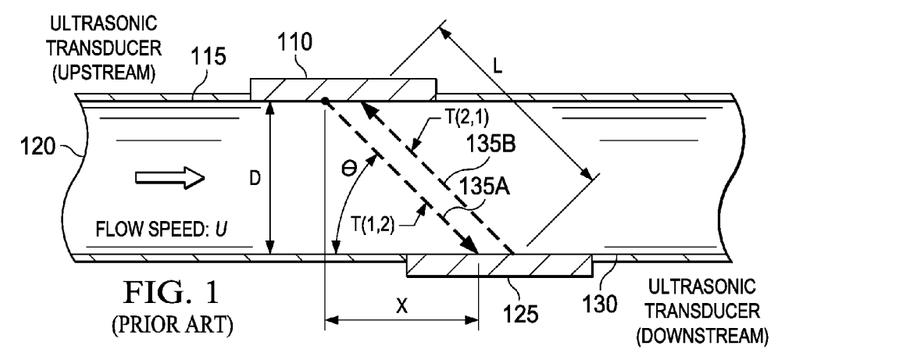
FIG. 1 is a prior-art diagram illustrating a fluid-flow measurement technique.

FIG. 1 is a prior-art diagram illustrating a fluid-flow measurement technique according to the prior art. A first ultrasonic transducer 110 is located at a wall 115 of a pipe 120 upstream from a second ultrasonic transducer 125 located further downstream at a wall 130 of the pipe 120.

A first ultrasonic signal is emitted from the upstream transducer 110 and received at the downstream transducer 125 across a path 135A. A time-of-flight (TOF) T(1,2) between emission and reception of the first ultrasonic signal is measured. A second ultrasonic signal is emitted from the downstream transducer 125 and received at the upstream transducer 110 across a path 135B. A TOF T(2,1) between emission and reception of the second ultrasonic signal is measured. The paths 135A and 135B are of equal length L. Each of the paths 135A and 135B lies at an angle $\theta$ to a longitudinal axis of the pipe 120.

The velocity of the ultrasonic signal traveling at the angle $\theta$ downstream is boosted by the fluid flow velocity through the pipe 120, thus decreasing the TOF(1,2). Likewise, the velocity of the ultrasonic signal traveling at the angle $\theta$ upstream is impeded by the fluid flow velocity through the pipe 120, thus increasing the TOF(2,1).

Specifically, the velocity of the first ultrasonic signal traversing the path 135A is the sum of the velocity C of the ultrasonic energy traveling through a stationary fluid of the type traversing the pipe 120 and a velocity vector component v of the fluid velocity U along the path 135A. U is the total velocity of the fluid flowing parallel to the longitudinal axis of the pipe 120. That is, the total velocity of the first ultrasonic signal traversing the path 135A of length L is equal to C+v. The TOF T(1,2) is therefor: T(1,2)=(distance)/(velocity)=L/(C+v).

Likewise, the velocity of the second ultrasonic signal traversing the path 135B is the difference between the velocity C of the ultrasonic energy traveling through a stationary fluid of the type traversing the pipe 120 and the velocity vector component v of the fluid velocity U along the path 135B. That is, the total velocity of the second ultrasonic signal traversing the path 135B of length L is equal to C−v. The TOF T(2,1) is therefor: T(2,1)=(distance)/(velocity)=L/(C−v).

The velocity C of the ultrasonic energy traveling through a stationary fluid is a constant for the particular fluid flowing through the pipe 120. Therefore, the measured T(1,2) and T(2,1) provide the two equations, above, in the unknowns v and L. Solving the two equations for v:

$$v = \frac{L}{2}\left[\frac{T(2,1) - T(1,2)}{T(1,2)*T(2,1)}\right]$$

However, the TOF measurements account only for the vector component v along the measurement paths 135A and 135B of the fluid flow velocity U. The entire fluid flow velocity U is equal to v/cos $\theta$. Thus:

$$U = \frac{L}{2\cos\theta}\left[\frac{T(2,1) - T(1,2)}{T(1,2)*T(2,1)}\right]$$

SUMMARY OF THE INVENTION

Apparatus and methods disclosed herein measure flow rates of a fluid flowing through a pipe or tube using a beam-forming array of ultrasonic transducer elements capable of mounting at a single position at a wall of the pipe or tube. (The terms "pipe" and "tube" are used synonymously within this disclosure.) A beam-forming driver circuit operates in conjunction with the array of ultrasonic transducer elements to provide directional control of ultrasonic energy emitted from and received at the array. The resulting ultrasonic beams are directed back to the single ultrasonic array by a series of acoustic mirrors mounted to or fabricated at known locations at an inside surface of the pipe. Embodiments described herein are commercially advantageous in that they employ a single ultrasonic transducer/transceiver unit rather than multiple units. Doing so decreases costs associated with the ultrasonic transducers themselves as well as costs of installation in the pipe and post-installation calibration.

The beam-forming driver circuit selectively activates transducer elements of the array to direct two or more outbound ultrasonic beams through a fluid flowing through the pipe to one or more acoustic mirrors. In some embodiments, the acoustic mirrors are mounted at an inside wall of the pipe. The ultrasonic beams travel along path segments of two types categorized by their effect on the beam TOFs. A "measurement" ultrasonic path segment traverses the fluid flow path at an angle of less than 90 degrees from the pipe longitudinal axis and includes an upstream or downstream fluid flow velocity component. A "non-measurement" path segment either traverses the fluid flow path at an angle of 90 degrees from the pipe longitudinal axis or is located near to the inside wall of the pipe where the fluid flow velocity is substantially zero. In both cases, non-measurement path segments effectively exclude upstream and downstream fluid flow velocity components.

Fluid flow velocity along the fluid flow path and fluid flow volume are calculated from TOF measurements as described in the previously-presented example. In the case of the disclosed apparatus and methods, however, contributions to TOF times from known-length non-measurement path segments are subtracted from the measured TOF totals. Doing so leaves the portions of the TOF measurements attributed to measurement path segments from which to calculate fluid flow velocities and volumes.

DETAILED DESCRIPTION

Figure 2:
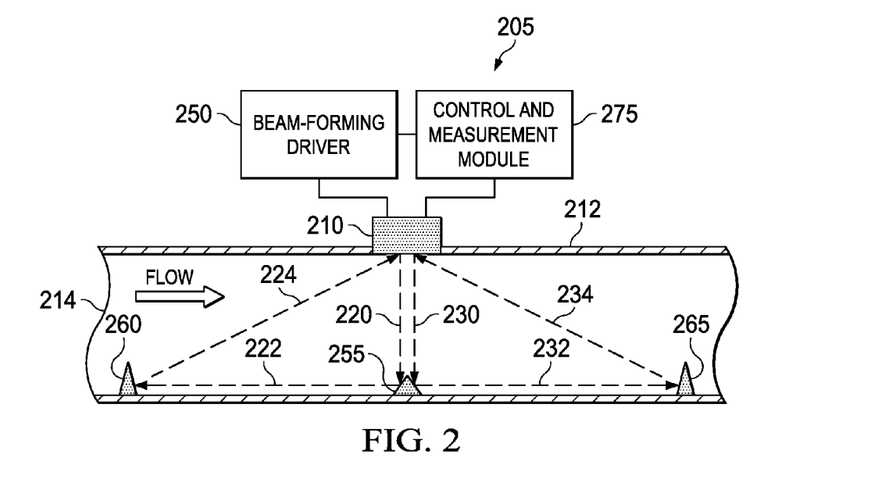
FIG. 2 is a diagram illustrating a fluid-flow measurement device employing a single beam-forming ultrasonic transducer array according to various example embodiments of the invention.

FIG. 2 is a diagram illustrating a fluid-flow measurement device 205 employing a single beam-forming ultrasonic transducer array 210 according to various example embodiments. The transducer array 210 includes individually selectable ultrasonic transducer elements and is capable of mounting at a single position at a wall 212 of a pipe 214. The fluid-flow measurement device 205 provides directional control of ultrasonic energy emitted from and received at the array of transducer elements 210 (e.g., the beam path segments 220 and 224 associated with the beam path 220-222-224 and the beam path segments 230 and 234 associated with the beam path 230-232-234).

The transducer elements of the single beam-forming ultrasonic transducer array 210 may include bulk piezoelectric transducer elements, capacitive micro-machined ultrasonic transducer (CMUT) elements, piezoelectric micro-machined ultrasonic transducer (PMUT) elements, or combinations thereof as further described below The fluid-flow measurement device 205 also includes a beam-forming driver circuit 250 communicatively coupled to the beam-forming ultrasonic transducer array 210. The beam-forming driver circuit 250 selectively activates one or more first sub-arrays of transducer elements of the array of transducer elements 210 to direct two or more outbound ultrasonic beams through a fluid flowing through the pipe. The ultrasonic beams travel to and from one or more acoustic mirrors mounted at an inside wall of the pipe (e.g., the acoustic mirrors 255 and 260 associated with the path 220-222-224 and the acoustic mirrors 255 and 265 associated with the path 230-232-234). It is noted that in some embodiments, the acoustic mirror(s) may consist of a portion of the inside wall of the pipe.

The beam-forming driver circuit 250 also selectively activates one or more second sub-arrays of transducer elements from the array 210 to sense a reflected return signal at a selected angle (e.g., the reflected return signals along the beam path segments 224 and 234 associated with each of the two outbound ultrasonic beams along the beam path segments 220 and 230, respectively.

In some embodiments, the first and second sub-arrays of transducer elements may consist of the same elements and/or may consist of all elements in the array of ultrasonic transducer elements 210. Whether or not sub-arrays are used for directional control of emitted and received ultrasonic beams depends upon beam-forming techniques implemented by the array of ultrasonic transducer elements 210 as controlled by the beam-forming driver circuit 250.

Some beam-forming techniques, for example, may utilize a first sub-array of elements to direct out-going beams along the path segments 220 and 230. A second sub-array might be used to listen for the first return signal from a direction of the measurement path 224, and a third sub-array might be used to listen for the second return signal from a direction of the measurement path 234. Some embodiments may use phased-array techniques to selectively energize individual elements and/or sub-arrays of elements of the array of ultrasonic transducer elements 210 to control beam lobe formation and thus beam direction. Individual elements and/or sub-arrays of elements may be selectively energized in one or more of time, frequency, phase, and magnitude domains, among others.

The fluid-flow measurement device 205 also includes a control and measurement module 275 communicatively coupled to the array of transducer elements 210. The control and measurement module 275 measures a TOF of each of the two or more ultrasonic beams (e.g., the beams associated with the beam paths 220-222-224 and 230-232-234) from emission from the array of transducer elements 210 to reception of the respective return signals at the array 210.

The control and measurement module 275 calculates fluid flow speed through the pipe 214 as a function of a difference in TOF between the two beams traversing the first and second paths 220-222-224 and 230-232-234, respectively. At least a portion of the difference in TOF results from an additive downstream fluid flow velocity vector component along the measurement segment 224 of the first path 220-222-224. Another portion of the difference in TOF results from a subtractive downstream fluid flow velocity vector component along the measurement segment 234 of the second path 230-232-234. Both of the measurement segments 224 and 234 traverse the fluid at an angle less than 90 degrees from a longitudinal axis of the pipe. In some embodiments, the first and second path measurement segments 224 and 234 are of equal length and the corresponding downstream and upstream fluid flow velocity components are of equal magnitude and opposite direction.

In some embodiments of the fluid flow measurement apparatus 205, the acoustic mirror(s) may be configured to reflect one of the ultrasonic beams in an upstream direction along the inside wall of the pipe where the flow rate of the fluid is zero or substantially zero and to reflect another one of the ultrasonic beams in a downstream direction along the inside wall of the pipe where the flow rate of the fluid is zero or substantially zero.

Figure 3:
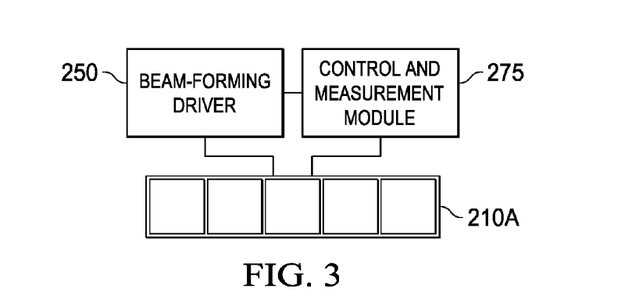
FIG. 3 is a diagram illustrating a fluid-flow measurement device employing a single-dimensional beam-forming ultrasonic transducer array according to various example embodiments.
Figure 4:
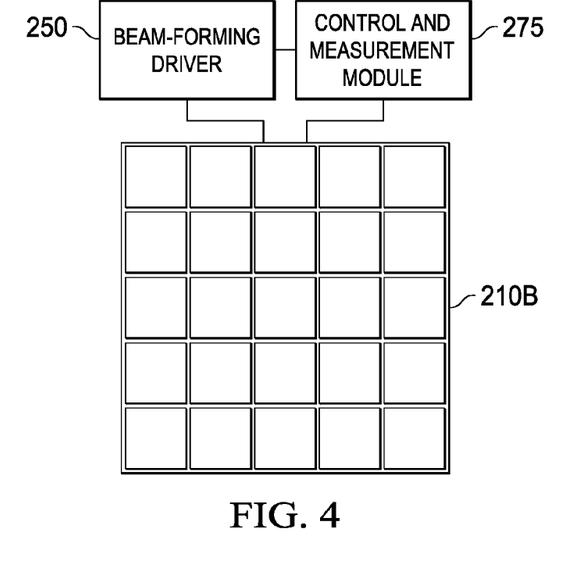
FIG. 4 is a diagram illustrating a fluid-flow measurement device employing a single two-dimensional beam-forming ultrasonic transducer array according to various example embodiments.
Figure 5:
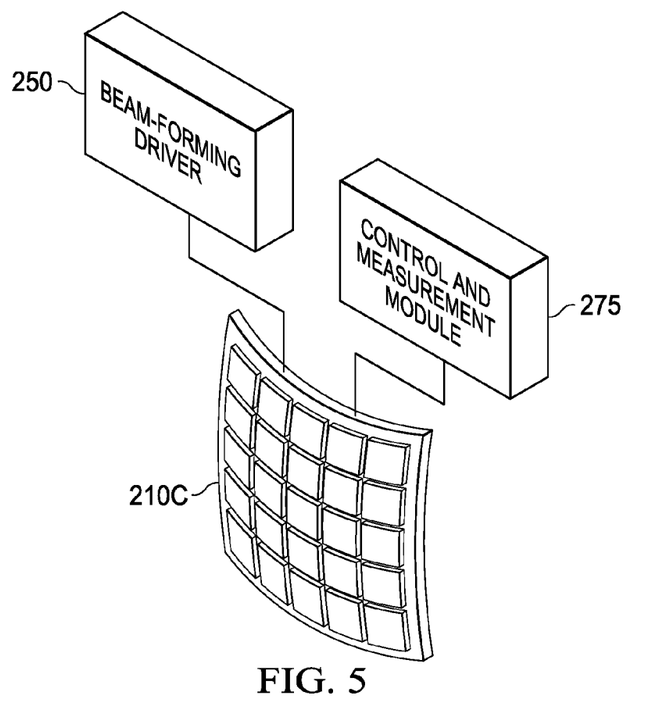
FIG. 5 is a diagram illustrating a fluid-flow measurement device employing a single convex three-dimensional beam-forming ultrasonic transducer array according to various example embodiments.

FIGS. 3-5 are diagrams illustrating the fluid-flow measurement device 205 employing beam-forming arrays of ultrasonic transducer elements 210A-210C according to various example embodiments. The transducer arrays 210A-210C are formed as a single-dimensional array, a two-dimensional array, and a three-dimensional array, respectively. The array 210C of FIG. 5 is formed as three-dimensional by adding convex curvature to the array 210B of FIG. 4.

Figure 6:
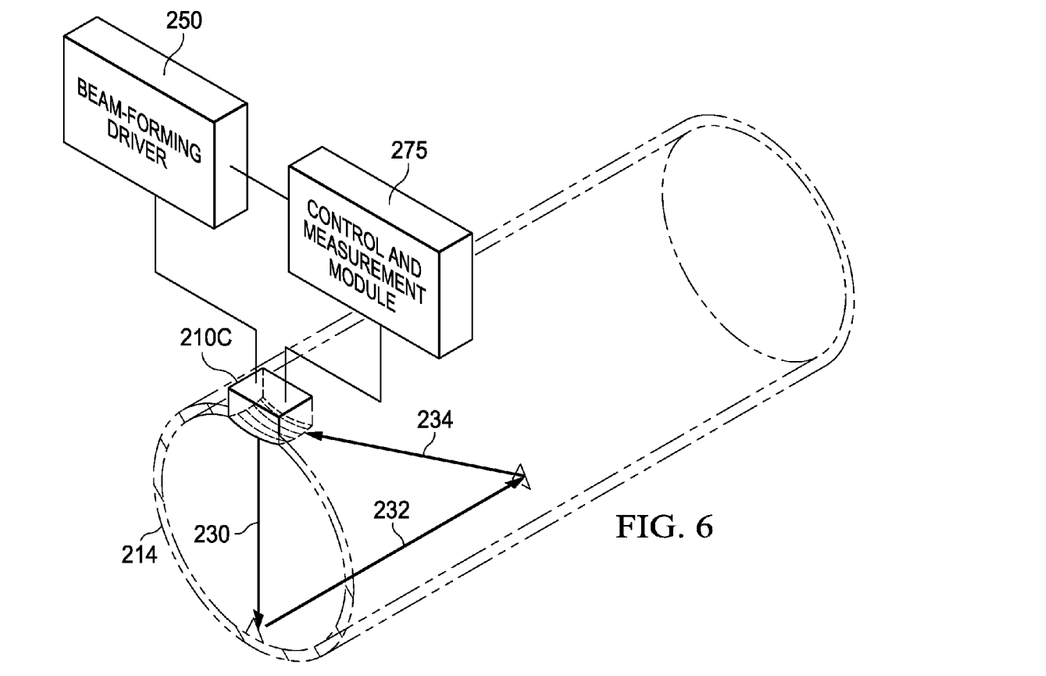
FIG. 6 is a diagram illustrating a fluid-flow measurement device employing a single convex three-dimensional beam-forming ultrasonic transducer array according to various example embodiments.

FIG. 6 is a diagram illustrating the fluid-flow measurement device 205 employing the convex three-dimensional beam-forming ultrasonic transducer array 210C according to various example embodiments. The array 210C is fitted at the pipe 214 and shows a beam path (e.g., the beam path 230-232-234 of FIG. 2). Angular differences between beam path emission from the array (e.g., the beam path segment 230) and reception at the array (e.g., the beam path segment 234) may be created by the convex curvature across the array, electronic beam directional control as further described below, or both.

Figure 7:
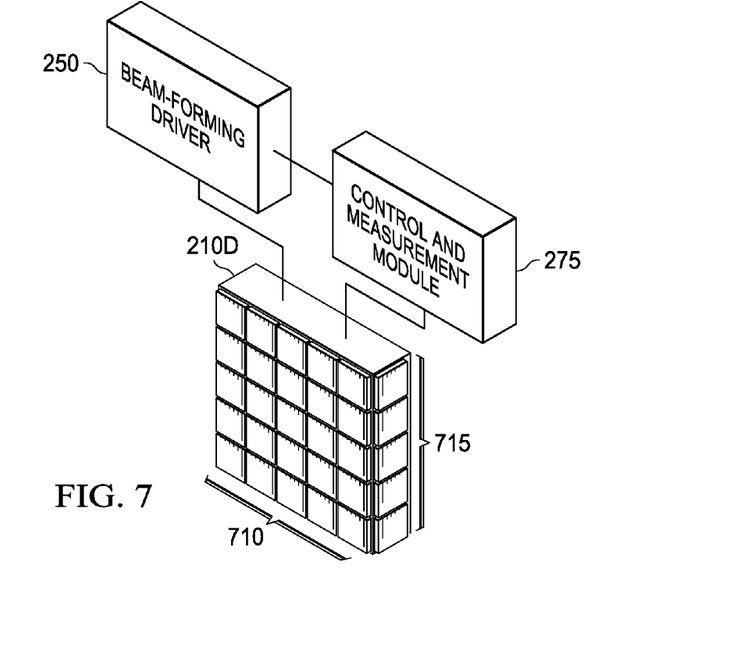
FIG. 7 is a diagram illustrating a fluid-flow measurement device employing a single beam-forming ultrasonic transducer array configured as a two-dimensional sub-array attached to a single-dimensional sub-array according to various example embodiments.

FIG. 7 is a diagram illustrating the fluid-flow measurement device 205 employing a single beam-forming ultrasonic transducer array 210D according to various example embodiments. The array 210D is formed as a plurality of sub-arrays of transducer elements (e.g., a two-dimensional sub-array 710 abutted to a single-dimensional sub-array 715). The plurality of sub-arrays of transducer elements is capable of projecting ultrasonic beams along beam path segments extending from and/or to the array 210D both parallel to and perpendicular to the longitudinal axis of the pipe 214.

Figure 8:
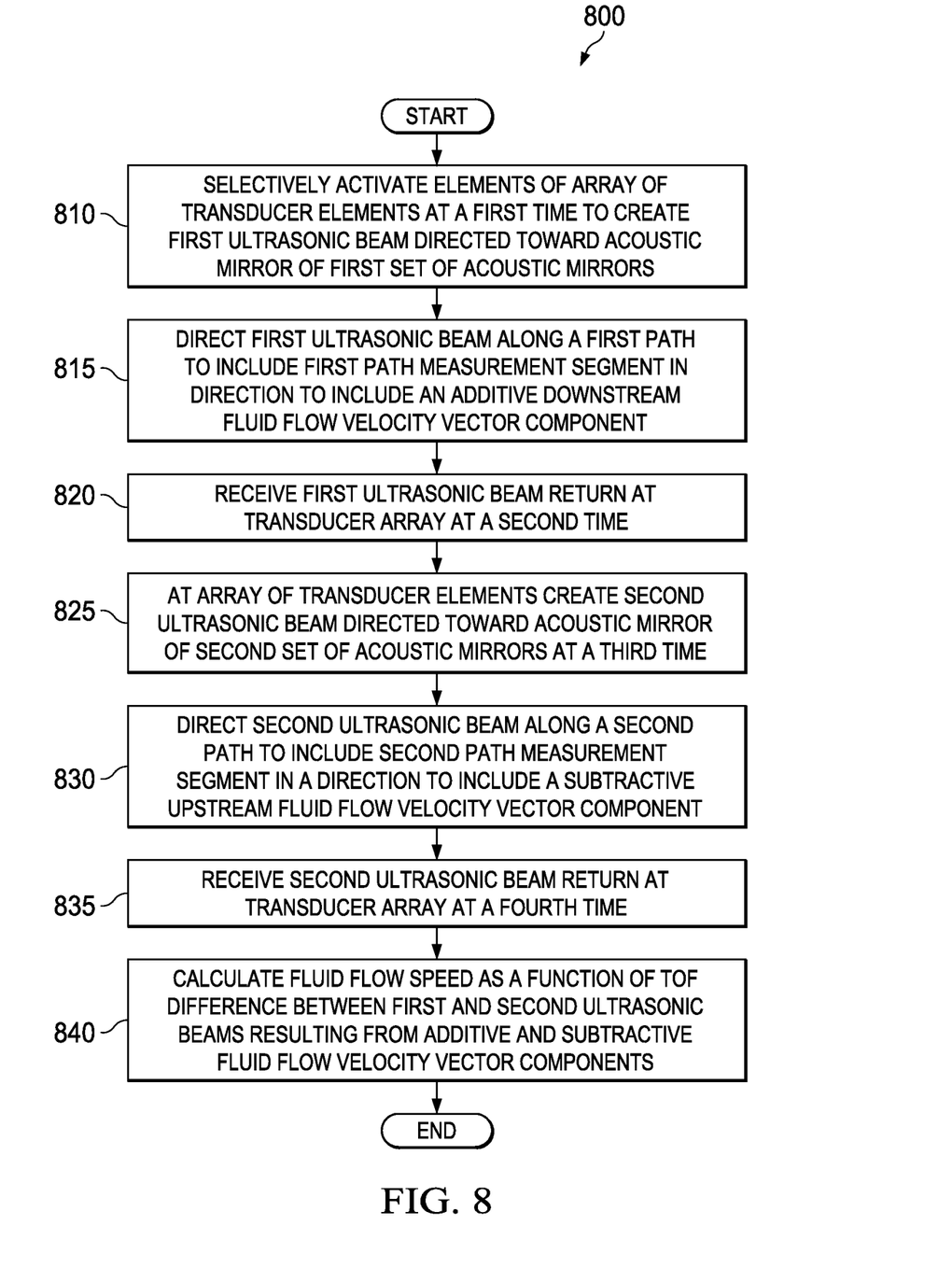
FIG. 8 is a flow diagram illustrating a method of fluid flow measurement according to various example activities.

FIG. 8 is a flow diagram illustrating a method 800 of fluid flow measurement according to various example activities. The method 800 commences at block 810 with selectively activating elements of an array of transducer elements capable of mounting at a single position at a wall of a pipe (e.g., the array of transducer elements 210 of FIG. 2). The transducer elements are selectively activated at a first time to create a first ultrasonic beam (e.g., the ultrasonic beam segment 220) directed toward an acoustic mirror (e.g., the acoustic mirror 255). The acoustic mirror is associated with a first series of acoustic mirrors (e.g., the series of acoustic mirrors 255 and 260).

The method 800 includes directing the first ultrasonic beam along a first path (e.g., the path 220-222-224 of FIG. 2), at block 815. The first path includes one or more first path measurement segments (e.g., the path measurement segment 224). The path measurement segment traverses a fluid flowing through the pipe at an angle less than 90 degrees from a longitudinal axis of the pipe. The path measurement segment proceeds in a direction to include an additive downstream fluid flow velocity vector component. The method 800 also includes receiving a return of the first ultrasonic beam at the array of transducer elements at a second time, at block 820.

The method 800 further includes creating a second ultrasonic beam (e.g., the ultrasonic beam segment 230 of FIG. 2) at the array of transducer elements, at block 825. The second ultrasonic beam is directed toward an acoustic mirror (e.g., the acoustic mirror 255) associated with a second series of acoustic mirrors (e.g., the series of acoustic mirrors 255 and 265 of FIG. 2) at a third time.

The method 800 continues at block 830 with directing the second ultrasonic beam along a second path (e.g., the path 230-232-234 of FIG. 2). The second path includes one or more second path measurement segments (e.g., the path measurement segment 234 of FIG. 2). The second path measurement segment traverses the fluid flowing through the pipe at an angle less than 90 degrees from the longitudinal axis of the pipe. The path measurement segment proceeds in a direction to include a subtractive upstream fluid flow velocity vector component. The method 800 also includes receiving a return of the second ultrasonic beam at the single array of transducer elements at a fourth time, at block 835.

The method 800 terminates at block 840 with calculating the fluid flow speed through the pipe as discussed above in detail. The fluid flow speed is a function of a difference in TOF between the first and second ultrasonic beams. At least a portion of the difference in TOF is a result of the additive downstream fluid flow velocity vector component along the first path measurement segment and the subtractive upstream fluid flow velocity vector component along the second path measurement segment. In some implementations of the method 800, the first and second paths are of equal length and the downstream and upstream fluid flow velocity vector components are of equal magnitude and opposite direction.

Figure 9:
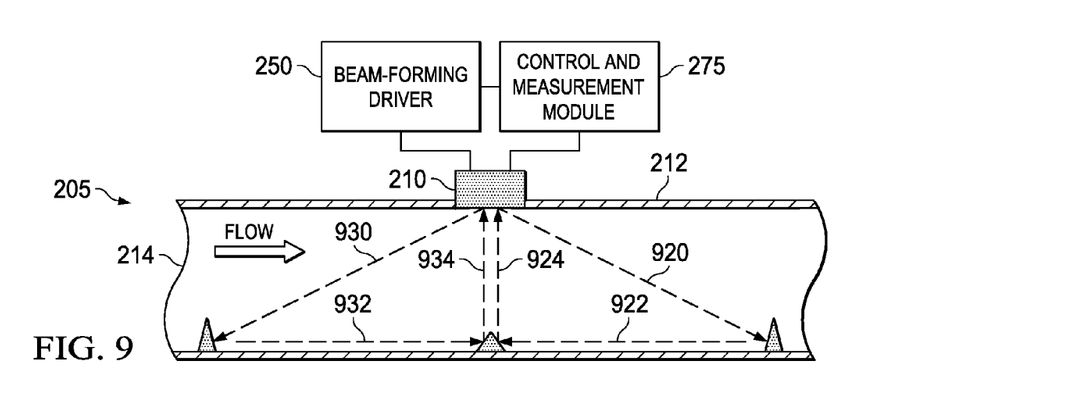
FIG. 9 is a diagram illustrating a sequence of ultrasonic beams associated with a fluid-flow measurement device implementing a method of fluid flow measurement according to various example activities.
Figure 10:
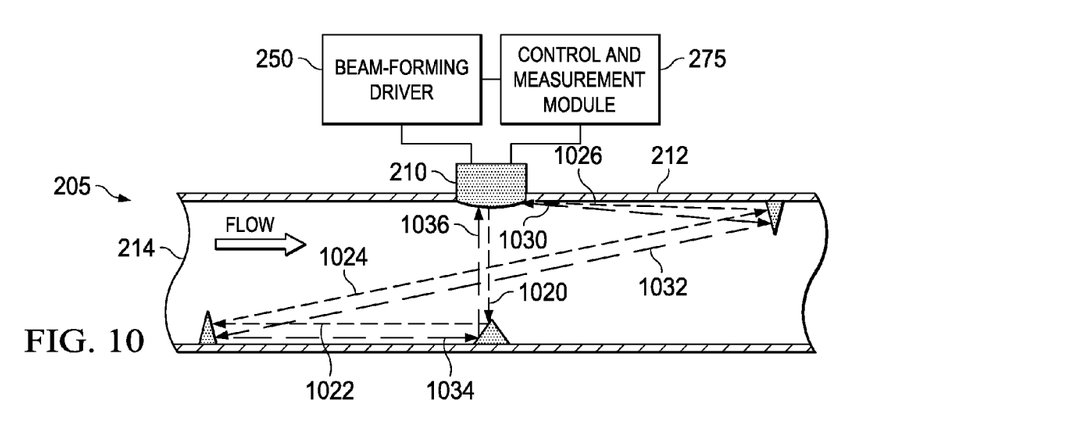
FIG. 10 is a diagram illustrating a sequence of ultrasonic beams associated with a fluid-flow measurement device implementing a method of fluid flow measurement according to various example activities.
Figure 11:
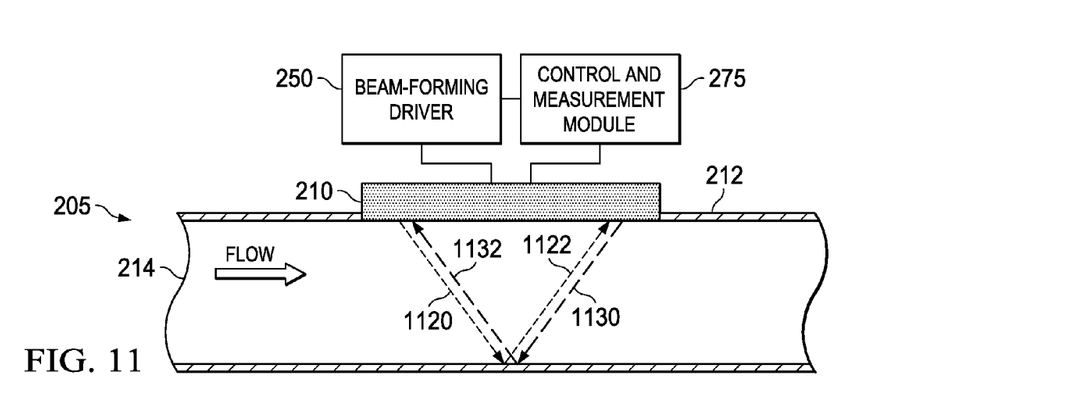
FIG. 11 is a diagram illustrating a sequence of ultrasonic beams associated with a fluid-flow measurement device implementing a method of fluid flow measurement according to various example activities.

FIGS. 9-11 are diagrams illustrating example sequences of ultrasonic beams generated by the fluid-flow measurement device 205 implementing the method 800. Some implementations of the method 800 include reflecting the first and second ultrasonic beams along the inside wall of the pipe 214 where the flow rate of the fluid is substantially zero. Examples include beam path segments 222 and 232 of FIG. 2; segments 922 and 932 of FIG. 9; and segments 1022, 1026, 1030, and 1034 of FIG. 10.

Some implementations of the method 800 include traversing the first and second path measurement segments between the array of transducer elements 210 and either a single acoustic mirror or an inner wall of the pipe 214 opposite the array of transducer elements 210 as illustrated in FIG. 11, paths 1120-1122 and 1130-1132.

Figure 12:
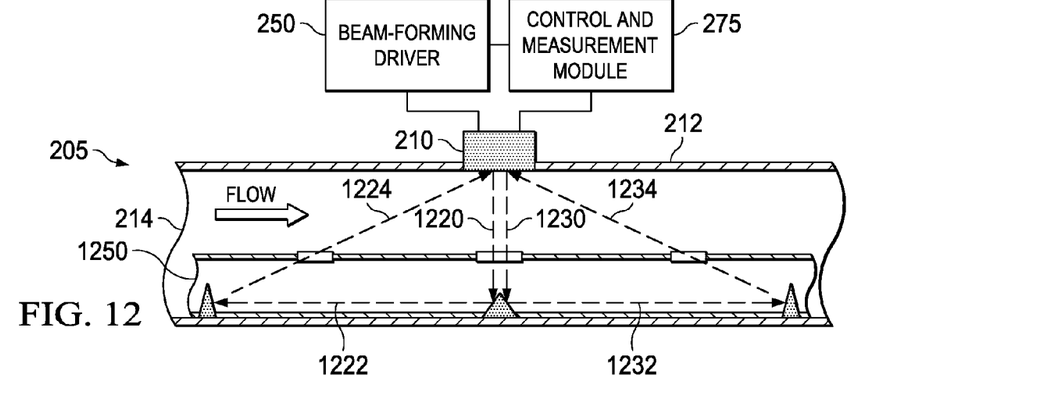
FIG. 12 is a diagram illustrating a sequence of ultrasonic beams associated with a fluid-flow measurement device implementing a method of fluid flow measurement, including ultrasonic beam path segments within a protected flow barrier according to various example activities.

FIG. 12 is a diagram illustrating a sequence of ultrasonic beams associated with a fluid-flow measurement device 205 implementing the method 800, including ultrasonic beam path segments within a protected flow barrier according to various example activities. The method 800 may include reflecting non-measurement path segments of the first and second ultrasonic beams (e.g., the path segments 1222 and 1232) within an enclosed channel 1250 formed along the inside wall of the pipe 214. Doing so further isolates such non-measurement path segments of the first and second ultrasonic beams from the fluid.

In some versions of the method 800, the first and second paths may each include various types of path segments. Path segment types include path segments orthogonal to the longitudinal axis of the pipe (e.g., the path segments 220 and 230 of FIG. 2; the path segments 924 and 934 of FIG. 9; the path segments 1020 and 1036 of FIG. 10; and the path segments 1220 and 1230 of FIG. 12. Fluid flow velocity components are zero or substantially zero along such orthogonal path segments. The first and second paths may also each include a segment extending along the inside wall of the pipe where the flow rate of the fluid is substantially zero, as previously described. Each path additionally includes one or more path measurement segments (e.g., the path measurement segments 224 and 234 of FIG. 2; the path measurement segments 920 and 930 of FIG. 9; the path measurement segments 1024 and 1032 of FIG. 10, the path measurement segments 1120, 1122, 1130, and 1132 of FIG. 11, and the path measurement segments 1224 and 1234 of FIG. 12).

Some implementations of the method 800 include traversing the first path measurement segment between the array of transducer elements and a first acoustic mirror and traversing the second path measurement segment between the array of transducer elements and a second acoustic mirror. (E.g., the path measurement segments 224 and 234 of FIG. 2; the path measurement segments 920 and 930 of FIG. 9; and the path measurement segments 1224 and 1234 of FIG. 12.) Other implementations of the method 800 include traversing the path measurement segments between acoustic mirrors (e.g., the path measurement segments 1024 and 1032 of FIG. 10).

Figure 13:
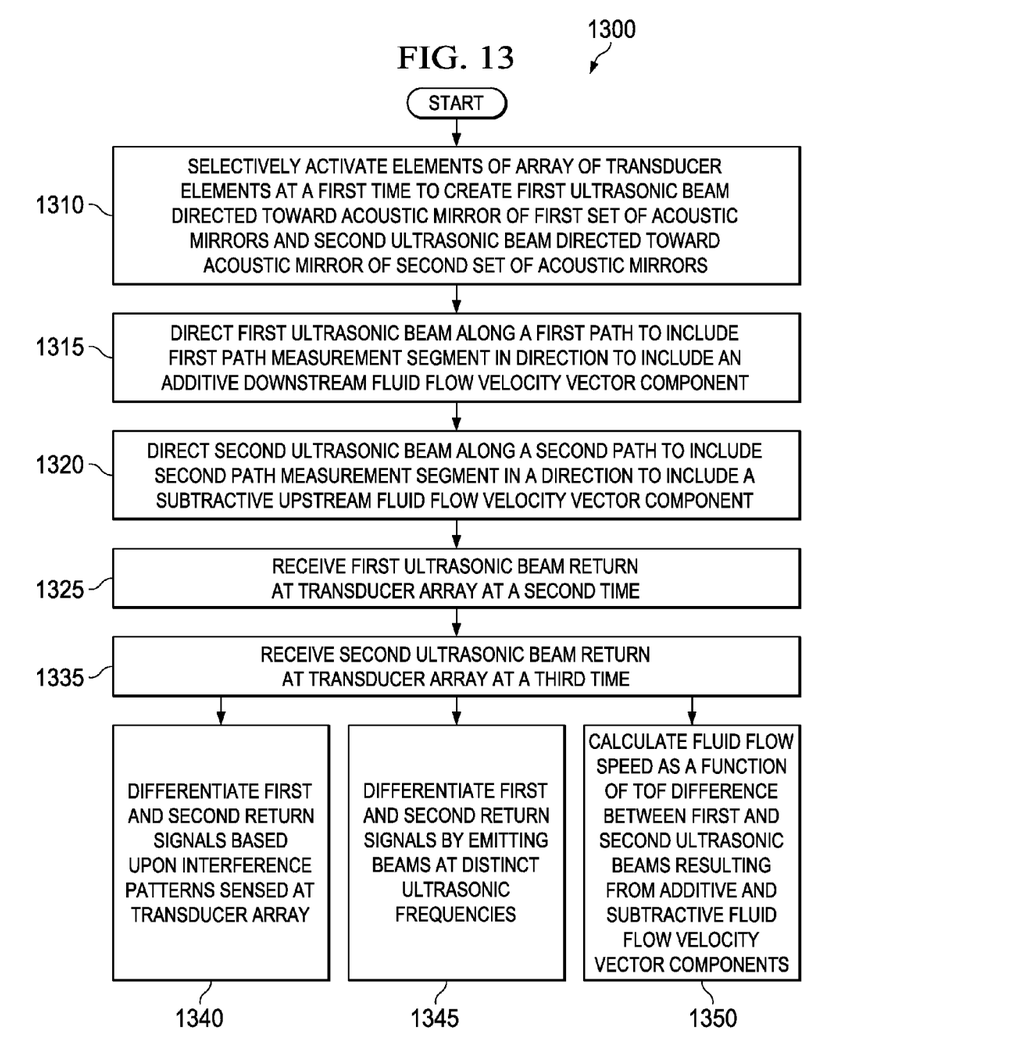
FIG. 13 is a flow diagram illustrating a method of fluid flow measurement according to various example activities.
Figure 14:
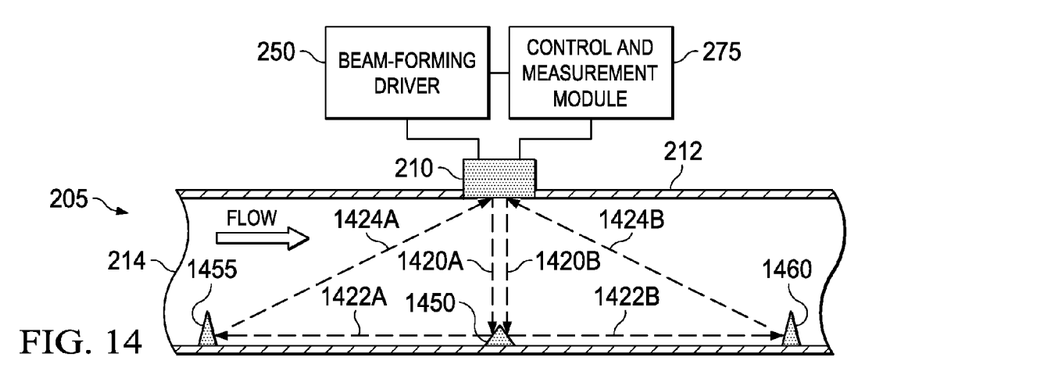
FIG. 14 is a diagram illustrating a sequence of ultrasonic beams simultaneously emitted by a single beam-forming ultrasonic transducer array associated with a fluid-flow measurement device implementing a method of fluid flow measurement according to various example activities.

FIG. 13 is a flow diagram illustrating a method 1300 of fluid flow measurement according to various example activities. FIG. 14 is a diagram illustrating a sequence of ultrasonic beams simultaneously emitted by a single beam-forming ultrasonic transducer array 210 associated with a fluid-flow measurement device 205 implementing the method 1300 according to various example activities. Activities associated with the method 1300 are described below with reference to the beam sequences illustrated in FIG. 14.

The method 1300 commences at block 1310 with selectively activating elements of an array of transducer elements capable of mounting at a single position at a wall of a pipe (e.g., the array of transducer elements 210 of FIG. 14). The transducer elements are selectively activated at a first time to create first and second ultrasonic beams (e.g., the ultrasonic beam segments 1420A and 1420B) directed toward one or more acoustic mirrors (e.g., the acoustic mirror 1450). The acoustic mirror(s) are associated with a first series and a second series of acoustic mirrors (e.g., the series of acoustic mirrors 1450, 1455 and the series of acoustic mirrors 1450 and 1460).

The method 1300 includes directing the first ultrasonic beam along a first path (e.g., the path 1420A-1422A-1424A of FIG. 2), at block 1315. The first path includes one or more first path measurement segments (e.g., the path measurement segment 1424A). The path measurement segment traverses a fluid flowing through the pipe at an angle less than 90 degrees from a longitudinal axis of the pipe. The path measurement segment proceeds in a direction to include an additive downstream fluid flow velocity vector component.

The method 1300 also includes directing the second ultrasonic beam along a second path (e.g., the path 1420B-1422B-1424B of FIG. 14), at block 1320. The second path includes one or more second path measurement segments (e.g., the path measurement segment 1424B). The path measurement segment traverses a fluid flowing through the pipe at an angle less than 90 degrees from a longitudinal axis of the pipe. The path measurement segment proceeds in a direction to include a subtractive upstream fluid flow velocity vector component.

The method 1300 further includes receiving a return of the first ultrasonic beam at the single array of transducer elements at a second time, at block 1325. The method 1300 also includes receiving a return of the second ultrasonic beam at the single array of transducer elements at a third time, at block 1335. Some versions of the method 1300 differentiate the first and second return signals based upon interference patterns created by the return signals at the single transducer array, at block 1340.

Figure 15:
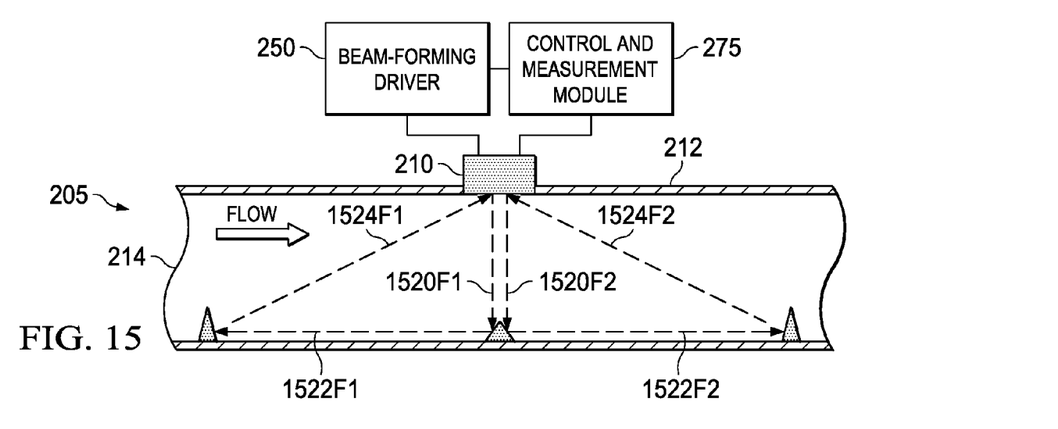
FIG. 15 is a diagram illustrating an example sequence of ultrasonic beams, each emitted at a distinct ultrasonic frequency from a single beam-forming ultrasonic transducer array associated with a fluid-flow measurement device implementing a method of fluid flow measurement according to various example activities.

FIG. 15 is a diagram illustrating an example sequence of ultrasonic beams, each emitted at a distinct ultrasonic frequency from a single beam-forming ultrasonic transducer array 210 associated with a fluid-flow measurement device 205 implementing the method 1300 according to various example sequences. An ultrasonic beam of frequency F1 traversing the beam path 1520F1-1522F1-1524F1 may be emitted at the same time as an ultrasonic beam of frequency F2 traversing the beam path 1520F2-1522F2-1524F2. Some versions of the method 1300 differentiate the first and second return signals based upon the ultrasonic frequencies of emission F1 and F2, at block 1345.

The method 1300 terminates at block 1350 with calculating the fluid flow speed through the pipe as discussed above in detail. The fluid flow speed is a function of a difference in TOF between the first and second ultrasonic beams. At least a portion of the difference in TOF is a result of the additive downstream fluid flow velocity vector component along the first path measurement segment and the subtractive upstream fluid flow velocity vector component along the second path measurement segment. In some implementations of the method 1300, the first and second paths are of equal length and the downstream and upstream fluid flow velocity vector components are of equal magnitude and opposite direction.

Apparatus, systems and methods described herein may be useful in applications other than single sensor fluid flow measurement. Examples of the apparatus 205 and the methods 800 and 1300 of single-sensor fluid flow measurement are intended to provide a general understanding of the sequences of various methods and the structures of various embodiments. They are not intended to serve as complete descriptions of all elements and features of methods, apparatus and systems that might make use of these example sequences and structures. The various embodiments may be incorporated into fluid flow systems for use in industrial, petrochemical, medical, scientific, computer, and other applications.

Apparatus and methods disclosed herein include a single array of ultrasonic transducer elements mounted at a single location at a surface of a pipe and associated driver and measurement circuits to provide directional control of ultrasonic energy emitted from and received at the array. The resulting ultrasonic beams are directed back to the single ultrasonic array by a series of acoustic mirrors mounted to or fabricated at known locations at an inside surface of the pipe. Embodiments described herein are commercially advantageous in that they employ a single ultrasonic transducer/transceiver unit rather than multiple units. Doing so decreases costs associated with the ultrasonic transducers themselves as well as costs of installation in the pipe and post-installation calibration.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A fluid flow measurement apparatus, comprising:
a beam-forming array of ultrasonic transducer elements capable of mounting at a single position at a wall of a pipe to provide directional control of ultrasonic energy emitted from the array of transducer elements and received at the array of transducer elements;
a beam-forming driver circuit communicatively coupled to the beam-forming array of ultrasonic transducer elements to selectively activate at least one first sub-array of the array of transducer elements such as to direct at least two outbound ultrasonic beams through a fluid flowing through the pipe to at least one acoustic mirror mounted at an inside wall of the pipe and to selectively activate at least one second sub-array of transducer elements to sense a reflected return signal associated with each of the at least two outbound ultrasonic beams at a selected angle; and
a control and measurement module communicatively coupled to the beam-forming array of ultrasonic transducer elements to measure a time-of-flight (TOF) of the at least two outbound ultrasonic beams from emission from the array of ultrasonic transducer elements to reception of the reflected return signal at the array of ultrasonic transducer elements and to calculate a fluid flow speed as a function of a difference in TOF between a first of the at least two outbound ultrasonic beams capable of traversing a first path and a second of the at least two outbound ultrasonic beams capable of traversing a second path.

2. The fluid flow measurement apparatus of claim 1, wherein at least a portion of the difference in TOF is a result of an additive downstream fluid flow velocity vector component along a first path measurement segment traversing the fluid at an angle less than 90 degrees from a longitudinal axis of the pipe and a subtractive upstream fluid flow velocity vector component along a second path measurement segment traversing the fluid at the angle less than 90 degrees from the longitudinal axis of the pipe.

3. The fluid flow measurement apparatus of claim 2, the first and second path measurement segments being of equal length and the downstream and upstream fluid flow velocity vector components being of equal magnitude and opposite direction.

4. The fluid flow measurement apparatus of claim 1, the first and second sub-arrays of transducer elements consisting of the same elements.

5. The fluid flow measurement apparatus of claim 1, the at least one acoustic mirror configured to reflect the at least two outbound ultrasonic beams along the inside wall of the pipe where a flow rate of the fluid is substantially zero.

6. The fluid flow measurement apparatus of claim 1, the beam-forming array of ultrasonic transducer elements formed as at least one of a single-dimensional array, a two-dimensional array, or a three-dimensional array.

7. The fluid flow measurement apparatus of claim 1, the beam-forming array of transducer elements formed as a plurality of sub-arrays of transducer elements capable of projecting the outbound ultrasonic beams along beam path segments extending from and/or to the beam-forming array of transducer elements both parallel to a longitudinal axis of the pipe and perpendicular to the longitudinal axis of the pipe.

8. The fluid flow measurement apparatus of claim 1, at least one transducer element of the array of transducer elements selected from a group consisting of a bulk piezoelectric transducer element, a capacitive micro-machined ultrasonic transducer (CMUT) element, and a piezoelectric micro-machined ultrasonic transducer (PMUT) element.

9. The fluid flow measurement apparatus of claim 1, the at least one acoustic mirror formed by a portion of the inside wall of the pipe.

10. A method of fluid flow measurement, comprising:
selectively activating elements of an array of transducer elements capable of mounting at a single position at a wall of a pipe to create a first ultrasonic beam directed toward an acoustic mirror associated with a first series of acoustic mirrors at a first time;
directing the first ultrasonic beam along a first path to include at least one first path measurement segment to traverse a fluid flowing through the pipe at an angle less than 90 degrees from a longitudinal axis of the pipe in a direction to include an additive downstream fluid flow velocity vector component;
receiving a return of the first ultrasonic beam at the array of transducer elements at a second time;
at the array of transducer elements, creating a second ultrasonic beam directed toward an acoustic mirror associated with a second series of acoustic mirrors at a third time;
directing the second ultrasonic beam along a second path to include at least one second path measurement segment to traverse the fluid flowing through the pipe at the angle less than 90 degrees from the longitudinal axis of the pipe in a direction to include a subtractive upstream fluid flow velocity vector component;
receiving a return of the second ultrasonic beam at the array of transducer elements at a fourth time;
calculating a fluid flow speed as a function of a difference in time-of-flight (TOF) between the first and second ultrasonic beams, at least a portion of the difference in TOF being a result of the additive downstream fluid flow velocity vector component along the first path measurement segment and the subtractive upstream fluid flow velocity vector component along the second path measurement segment.

11. The method of fluid flow measurement of claim 10, the first and second paths being of equal length and the downstream and upstream fluid flow velocity vector components being of equal magnitude and opposite direction.

12. The method of fluid flow measurement of claim 10, further comprising:
reflecting the first and second ultrasonic beams along an inside wall of the pipe where a flow rate of the fluid is substantially zero.

13. The method of fluid flow measurement of claim 10, further comprising:
reflecting the first and second ultrasonic beams within an enclosed channel formed along an inside wall of the pipe to isolate the first and second ultrasonic beams from the fluid.

14. The method of fluid flow measurement of claim 10, the first and second paths each including a segment orthogonal to the longitudinal axis of the pipe and a segment extending along an inside wall of the pipe where a flow rate of the fluid is substantially zero, the first path additionally including the first path measurement segment and the second path additionally including the second path measurement segment.

15. The method of fluid flow measurement of claim 10, wherein the acoustic mirror associated with the first series of acoustic mirrors is a first acoustic mirror, the acoustic mirror associated with the second series of acoustic mirrors is a second acoustic mirror, the method further comprising:
traversing the first path measurement segment between the array of transducer elements and a third acoustic mirror; and
traversing the second path measurement segment between the array of transducer elements and a fourth acoustic mirror.

16. The method of fluid flow measurement of claim 10, further comprising:
traversing the first and second path measurement segments between two acoustic mirrors.

17. The method of fluid flow measurement of claim 10, wherein the acoustic mirror associated with the first series of acoustic mirrors is a first acoustic mirror, the acoustic mirror associated with the second series of acoustic mirrors is a second acoustic mirror, the method further comprising:
traversing the first and second path measurement segments between the array of transducer elements and at least one of a single third acoustic mirror or an inner wall of the pipe opposite the array of transducer elements.

18. A method of fluid flow measurement, comprising:
selectively activating elements of an array of transducer elements capable of mounting at a single position at a wall of a pipe to create a first ultrasonic beam and a second ultrasonic beam at a first time, the first ultrasonic beam directed toward an acoustic mirror associated with a first series of acoustic mirrors and the second ultrasonic beam directed toward an acoustic mirror associated with a second series of acoustic mirrors;
directing the first ultrasonic beam along a first path to include at least one first path measurement segment to traverse a fluid flowing through the pipe at an angle less than 90 degrees from a longitudinal axis of the pipe in a direction to include an additive downstream fluid flow velocity vector component;
receiving a return of the first ultrasonic beam at the array of transducer elements at a second time;
directing the second ultrasonic beam along a second path to include at least one second path measurement segment to traverse the fluid flowing through the pipe at the angle less than 90 degrees from the longitudinal axis of the pipe in a direction to include a subtractive upstream fluid flow velocity vector component;
receiving a return of the second ultrasonic beam at the array of transducer elements at a third time; and
calculating a fluid flow speed as a function of a difference in time-of-flight (TOF) between the first and second ultrasonic beams, at least a portion of the difference in TOF being a result of the additive downstream fluid flow velocity vector component along the first path measurement segment and the subtractive upstream fluid flow velocity vector component along the second path measurement segment.

19. The method of fluid flow measurement of claim 18, further comprising:
differentiating the respective return signals from the first and second ultrasonic beams based upon interference patterns associated with the respective returns as sensed at the array of transducer elements.

20. The method of fluid flow measurement of claim 18, further comprising:
differentiating the respective return signals from the first and second ultrasonic beams by emitting the first ultrasonic beam at a frequency distinct from a frequency used to emit the second ultrasonic beam.

* * * * *